United States Patent [19]

Lochmoeller

[11] Patent Number: 4,623,051
[45] Date of Patent: Nov. 18, 1986

[54] LOAD BEARING, ONE-WAY, SPRING CLUTCH ASSEMBLY

[75] Inventor: Stephen A. Lochmoeller, St. Louis, Mo.

[73] Assignee: Roton Products, Inc., St. Louis, Mo.

[21] Appl. No.: 606,212

[22] Filed: May 2, 1984

[51] Int. Cl.⁴ ............................................. F16D 67/00
[52] U.S. Cl. .................................. 192/8 C; 192/41.5; 192/81 C; 254/DIG. 2
[58] Field of Search ............... 192/8 C, 12 BA, 41 S, 192/81 C, 56 C, 84 T; 254/98, 103, DIG. 2

[56] References Cited

U.S. PATENT DOCUMENTS

| | | | |
|---|---|---|---|
| 2,009,964 | 7/1935 | Mottlau | 192/41 S X |
| 2,052,961 | 9/1936 | Bonham | 192/41 S X |
| 2,089,807 | 8/1937 | Mottlau | 192/41 S X |
| 3,030,073 | 4/1962 | Rhoads | 254/98 X |
| 3,297,121 | 1/1967 | Hansen | 192/41 S X |
| 3,458,173 | 7/1969 | Kornovich | 254/DIG. 2 |
| 3,797,618 | 3/1974 | Peterson et al. | 192/12 BA |
| 3,966,024 | 6/1976 | Baer | 192/12 BA X |
| 4,246,991 | 1/1981 | Oldakowski | 192/8 C |

FOREIGN PATENT DOCUMENTS 2459953  7/1976  Fed. Rep. of Germany ... 254/DIG. 2

*Primary Examiner*—Willis R. Wolfe, Jr.
*Attorney, Agent, or Firm*—Rogers, Howell, Moore & Haferkamp

[57] ABSTRACT

A load bearing, one-way, spring clutch assembly for use in a load bearing assembly where the load bearing assembly includes a housing, a shaft rotatably mounted to the housing, a drive for applying a first torsion load to the shaft, and a thrust load applying a second torsion load to the shaft in a direction opposite the first torsion load. The load bearing, one-way, spring clutch assembly has first and second clutch members, one of the clutch members secured to the shaft for rotation therewith, and the other clutch member mounted on the shaft for rotation about a common axis with the one clutch member. Thrust load bearings are between the clutch members for carrying the thrust load. A spring clutch allows rotation of the one clutch member relative to the other where the first torsion load is greater than the second torsion load, and locks the clutch members together so that the one clutch member cannot rotate relative to the other where the second torsion load is greater than the first torsion load. A friction plate between the clutch assembly and housing resists rotation of the clutch assembly and shaft as otherwise would be caused by the thrust load.

23 Claims, 4 Drawing Figures

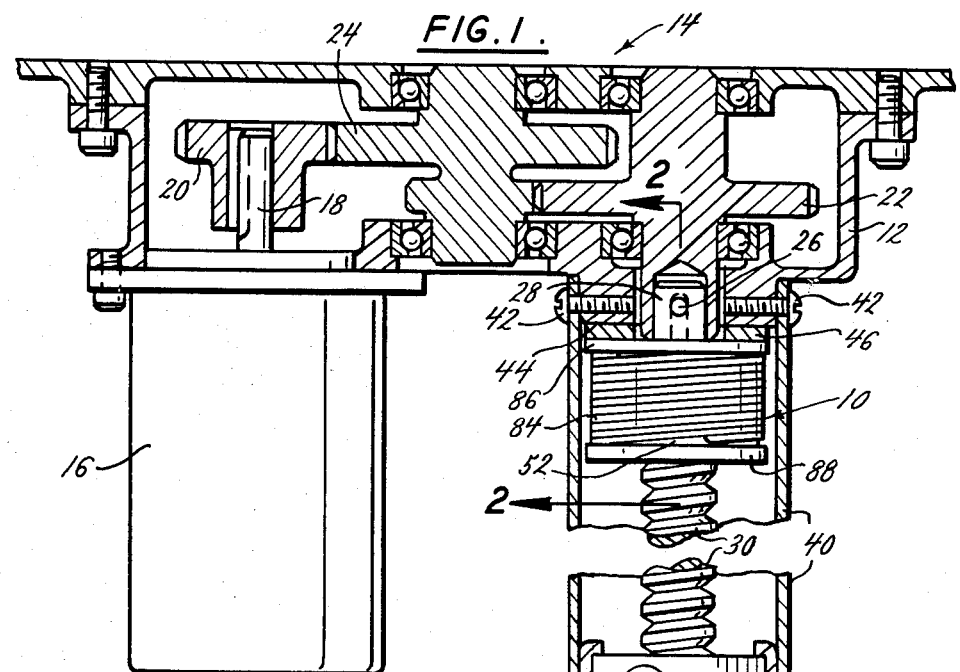
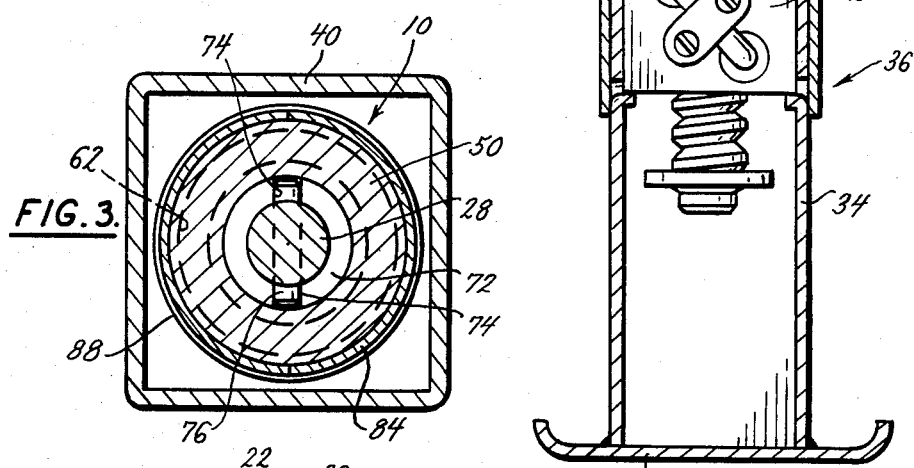
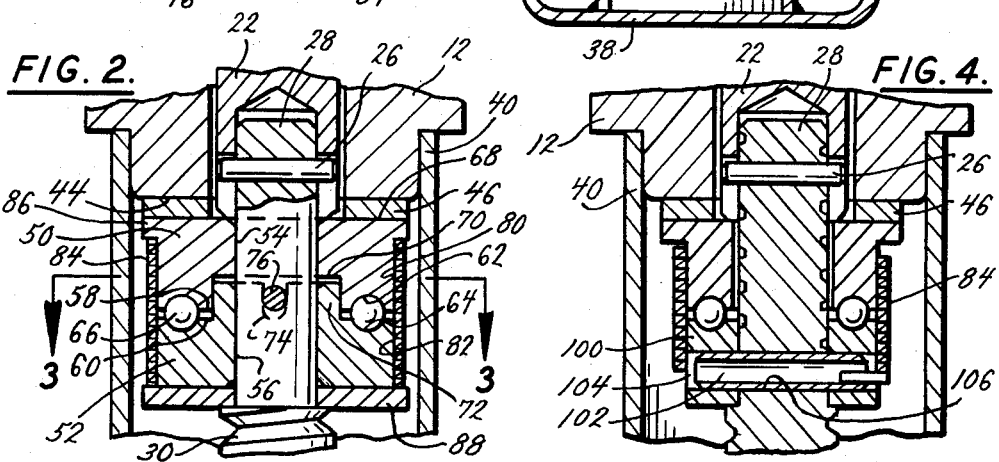

4,623,051

LOAD BEARING, ONE-WAY, SPRING CLUTCH ASSEMBLY

BACKGROUND AND SUMMARY OF THE INVENTION

This invention generally relates to a one-way spring clutch assembly, and more specifically to such an assembly having bearing means for carrying a thrust load. The invention also relates to an application of the clutch assembly in preventing reverse rotation of a shaft such as a ball screw under a thrust load as applied through a ball nut.

Spring clutches are well known in the art as exemplified in U.S. Pats. Nos. 2,784,810, 3,410,379, 3,637,056, 3,797,618, and 4,246,991, the entirety of which are incorporated herein by reference. It is known in the art to apply a spring clutch in combination with a ball screw and nut assembly as exemplified in U.S. Pat. No. 4,246,991, and it is further known to apply a spring clutch with bearing means for carrying thrust loads, such as through a ball nut and screw, together with a friction plate for resisting reverse rotation of the shaft under thrust load.

One such known spring clutch assembly has first and second clutch members where one of the clutch members has a flange for securing it to a housing so that it does not rotate, and where neither clutch member is secured to the shaft for rotation therewith. Instead, the other clutch member engages a friction plate located between the clutch member and a disc secured to the shaft. The present invention represents an improvement over these prior art spring clutch assemblies.

Generally, the spring clutch assembly of the present invention comprises first and second clutch members mounted on a shaft such as a ball screw for rotation about a common axis. The shaft is mounted for rotation relative to a housing. Between the clutch members are thrust load bearing means which may be ball bearings seated in annular races in facing surfaces of the clutch members. A torsion spring surrounds the clutch members, such that torsion loads rotating the shaft in one direction tend to unwind and loosen the torsion spring allowing one clutch member to rotate relative to the other, and torsion loads tending to rotate the shaft in the opposite direction tend to wind and tighten the torsion spring against the outer surfaces of the clutch members to lock the clutch members against rotation of one relative to the other. Neither clutch member is secured to the housing so that no flange is needed and a narrow profile can be maintained.

In a particular application of the spring clutch assembly in accordance with the invention, means such as a friction plate are provided between one of the clutch members and the housing preventing reverse rotation of the shaft as would be caused by a thrust load.

In a preferred embodiment of the invention one of the clutch members is secured to the shaft for rotation therewith. This is accomplished by the clutch members having a mating hub and recess with the hub having a transverse open slot for receiving a locking pin which extends through the shaft to lock the clutch members to the shaft. By this construction, the clutch member may be molded of powdered metal which is comparatively inexpensive.

These and other objects and advantages of the invention are apparent from the drawing and detailed description to follow.

DESCRIPTION OF THE DRAWING

FIG. 1 is a view in partial section of a load bearing, one-way, spring clutch assembly of the present invention, and a particular application of the clutch assembly in accordance with the present invention;

FIG. 2 is a view in section taken generally along the line 2—2 of FIG. 1;

FIG. 3 is a view in section taken generally along the line 3—3 of FIG. 2; and

FIG. 4 is a view similar to FIG. 2 and showing a modified mounting of the shaft.

DETAILED DESCRIPTION OF A PREFERRED EMBODIMENT

With reference to the drawing, there is shown a load bearing, one-way spring clutch assembly 10 of the present invention, and an application of the clutch assembly in accordance with the present invention. There is included a housing 12 to which is mounted a gear drive 14 driven by an electric motor 16. The motor 16 is mounted to the housing and has a shaft 18 secured to a first gear 20. The gear 20 drives an output gear 22 through a gear reduction 24.

Secured to the output gear 22 by means of a locking pin 26, or other suitable means, is the upper end 28 of a ball screw shaft 30 which depends from the housing. The ball screw 30 engages a ball nut 32 secured to the inner tubular telescoping member 34 of a leg 36 having a suitable foot pad 38 at the lower end thereof. The leg 36 also includes an outer tubular member 40 depending from the housing with its upper end secured thereto by means of bolts 42 or the like. Between the clutch assembly 10 and a lower smooth surface 44 of the housing, is a friction plate or washer 46 of bronze or other suitable material to resist rotation of the entire clutch assembly relative to the housing as will be further explained.

The spring clutch assembly 10 includes a first or upper clutch member 50, and a second or lower clutch member 52. The clutch members are annular and have axial openings 54 and 56, respectively, through which the upper end 28 of the shaft extends. They also have facing surfaces 58 and 60, respectively, having annular grooves or bearing races 62 and 64 that receive ball bearings 66 to carry the thrust load as will be further explained. The upper clutch member has an upper smooth surface 68 which contacts one side of the friction plate or washer 46.

In the preferred embodiment of FIG. 2, the upper clutch member has central recess 70 into which extends a hub 72 of the lower clutch member. The hub 72 has a transverse slot 74 aligned with a transverse hole in the shaft for receiving a locking pin 76 to lock the shaft to the lower clutch member. This construction makes it possible for the clutch members to be made of powdered metal of an air hardening grade and completely formed by the mold. The upper and lower clutch members have smooth outer surfaces 80 and 82, respectively, surrounded by a torsion clutch spring 84 held in place between an upper annular shoulder 86 of the upper clutch member, and a washer 88 at the bottom of the lower clutch member. The torsion spring is wound in close contact with the outer surfaces 80 and 82 of the clutch members. In this described embodiment, the torsion spring is right hand wound.

In the modification of FIG. 4, there is no mating hub and recess. Instead, the lower clutch member 100 is secured to the shaft by a pin 102 extending through aligned holes 104 and 106 in the clutch member and shaft.

OPERATION

In explaining the operation of the spring clutch assembly of the present invention, and its application in accordance with the invention, the housing 12 may be the frame or housing of a trailer, and the leg 36 may be the telescoping stabilizer leg of a trailer which may be lowered and raised by rotation of the ball screw through operation of the motor 16 through the gear drive 14. The advantages of the present invention are particularly apparent when considered in light of the application shown and described, for while a ball screw and nut assembly is very efficient, it also has the disadvantage that a thrust load applied to the ball nut as by the weight of the trailer on the stabilizing leg, will cause the ball screw to turn and retract the leg. In other words, with the motor 16 disengaged, the lower telescoping portion 34 of the leg will retract, rather than hold its position. As will now be explained, this retraction of the leg is prevented by the spring clutch assembly of the present invention, which also incorporates bearing means for carrying the thrust load, and its application. Moreover, it will be noted that the narrow profile of the clutch assembly, no flange being required to secure either clutch member to the housing, permits mounting in a narrow profile member such as the trailer leg shown.

Thus, to extend the leg 36 the motor is operated in a direction to rotate the ball screw in a counterclockwise direction as viewed in FIG. 3. Counterclockwise rotation of the ball screw produces counterclockwise rotation of the lower clutch member 52. With rotation of the upper clutch member resisted by its frictional engagement with the friction plate 46, the torsion spring 80 unwinds sufficiently to provide a loose engagement between the spring and the clutch members. This allows the lower clutch member to rotate freely relative to the upper clutch member with the bearings 66 carrying the thrust load. As the thrust load increases due to the increased weight of the trailer carried by the leg, the friction between the upper clutch member and the friction plate, and between the friction plate and the housing, increases proportionally. In other words, the greater the thrust load, the greater the friction.

When the leg has been extended to a selected position, the spring clutch assembly, and the friction plate 46, prevent retraction of the leg under the thrust load as otherwise would occur with the use of a ball screw and nut as shown. Thus, when the motor 16 is deactuated, so that no torque is applied to the shaft 30 that would rotate the shaft in a counterclockwise direction, the thrust load applied to the ball nut produces a torque that tends to rotate the shaft and the lower clutch member in a clockwise direction as view in FIG. 3. With the friction plate 46 preventing movement of the upper clutch member, the torsion spring winds to tightly grip the outer surfaces of the clutch members and lock them together so that the lower clutch member cannot rotate relative to the upper clutch member. There is sufficient friction between the spring clutch assembly and the friction plate and between the friction plate and the housing to prevent clockwise rotation of the shaft under the thrust load so that extension of the leg is maintained when the motor is disengaged.

To retract the leg, the motor 16 is engaged in reverse to overcome the friction of the friction plate 46 so that the entire spring clutch assembly and shaft rotate in a clockwise direction to retract the leg. In doing so, the friction plate 46 may either rotate with the spring clutch assembly, or remain stationary, depending on the relative friction between the friction plate and the spring clutch assembly and between the friction plate and the housing.

Thus, there has been described a novel and improved load bearing, one-way, spring clutch assembly with bearing means for carrying a thrust load and adapted to prevent reverse rotation of a shaft, such as a ball screw, under a thrust load, where neither clutch member is secured to the housing, and where in the preferred embodiment the clutch members are comparatively inexpensive to fabricate.

There are various changes and modifications which may be made to applicant's invention as would be apparent to those skilled in the art. However, any of these teachings or modifications are included in the teaching of applicant's disclosure and he intends that his invention be limited only by the scope of the claims appended hereto.

I claim:

1. In a load bearing assembly including a housing, a shaft rotatably mounted for rotation relative to said housing, drive means for driving said shaft in one direction, means applying a thrust load to said shaft tending to cause said shaft to rotate in the opposite direction: a load bearing, one way, spring clutch assembly comprising first and second clutch members, said clutch members mounted on said shaft for rotation about a common axis, one of said clutch members being secured to said shaft for rotation therewith, thrust load bearing means between said clutch members, spring clutch means allowing rotation of one clutch member relative to the other when said shaft is driven in said one direction, and locking said clutch members against rotation of said one clutch member relative to the other when said shaft tends to rotate in the opposite direction, and a friction plate between the other of said clutch members and said housing, said shaft being driven in said one direction at the side of said clutch assembly nearest said other clutch member.

2. In a load bearing assembly including a housing, a ball screw rotatably mounted for rotation relative to said housing, drive means for driving said ball screw to apply a first torsion load to said ball screw, a ball nut mounted on said ball screw, and means applying a thrust load to said ball screw nut thereby imparting a second torsion load to said ball screw in a direction opposite to said first torsion load; a load bearing, one way, spring clutch assembly comprising first and second clutch members, one of said cluch members secured to said ball screw for rotation therewith, and the other of said clutch members mounted on said ball screw for rotation about a common axis with said one clutch member, spring clutch means allowing rotation of said one clutch member relative to the other where said first torsion load is greater than the second torsion load, and locking said clutch members against rotation of said one clutch member relative to the other where said second torsion load is greater than said first torsion load, means between said clutch assembly and said housing resisting rotation of said other clutch member relative to said housing, means applying a third torsion load to said shaft in the same direction as said second torsion load, and wherein both clutch members rotate relative to said housing where said torsion loads are sufficient to overcome said rotation resisting means, said shaft being driven at the side of said clutch assembly nearest said other clutch members.

3. A load bearing, one-way, spring clutch assembly comprising a drive shaft, first and second clutch members mounted on said shaft for rotation about a common axis, one clutch member having a hub with a transverse slot therein, a locking pin extending through said slot and shaft to secure said shaft in rotational engagement with said one clutch member, the other clutch member having a recess receiving said hub, said clutch members being of molded powdered metal construction, thrust load bearing means between said clutch members, and spring clutch means locking said clutch members against relative rotation in one direction, and allowing relative rotation of the clutch members in the opposite direction, only one of said clutch members secured to said drive shaft for rotation therewith.

4. In a load bearing assembly including a housing, a ball screw rotatably mounted for rotation relative to said housing, drive means for driving said ball screw in one direction, a ball nut mounted on said ball screw, and means applying a thrust load to said ball screw nut tending to cause said ball screw to rotate in the opposite direction: a load bearing, one-way, spring clutch assembly comprising first and second clutch members, one of said clutch members secured to said ball screw for rotation therewith, the other of said clutch members mounted on said ball screw for rotation about a common axis with said one clutch member, thrust load bearing means between said clutch members, and spring clutch means allowing rotation of said one clutch member relative to the other when said shaft is driven in said one direction, and locking said clutch members against rotation of said one clutch member relative to the other when said shaft tends to rotate in the opposite direction.

5. The clutch assembly of claim 4 wherein said clutch members have facing surfaces each with bearing races therein, said thrust load bearing means further comprising ball bearings seated within said races.

6. In the load bearing assembly of claim 4 further comprising means resisting rotation of said other clutch member relative said housing.

7. In the clutch assembly of claim 6 wherein said clutch members have outer annular surfaces, and said spring clutch means is a torsion spring surrounding said surfaces, whereby a load tending to rotate one of the clutch members relative to the other in one direction tends to wind and tighten the spring against said surfaces, and a load rotating one of the clutch members relative to the other in the opposite direction tends to unwind and loosen the spring.

8. In the load bearing assembly of claim 6 wherein said means resisting rotation of said other clutch member relative to said housing further comprises a friction plate between said clutch assembly and housing.

9. In the load bearing assembly of claim 8 further including further drive means for driving said shaft in said opposite direction, and wherein both clutch members rotate relative said housing when said further drive means overcomes said friction.

10. In the clutch assembly of claim 8 wherein the friction of said friction plate between said clutch assembly and housing is proportional to said thrust load.

11. In a load bearing assembly including a housing, a shaft rotatably mounted for rotation relative to said housing, drive means for driving said shaft in one direction, and means applying a thrust load to said shaft tending to cause said shaft to rotate in the opposite direction: a load bearing, one-way, spring clutch assembly comprising first and second clutch members, said clutch members mounted on said shaft for rotation about a common axis, thrust load bearing means between said clutch members, and spring clutch means allowing rotation of one clutch member relative to the other when said shaft is driven in said one direction, and locking said clutch members against rotation of said one clutch member relative to the other when said shaft tends to rotate in the opposite direction.

12. In the load bearing assembly of claim 11 wherein one of said clutch members is secured to said drive shaft for rotation therewith, and the other of said clutch members is adapted for engagement with a friction plate.

13. In the load bearing assembly of claim 11 wherein said clutch members have facing surfaces each with bearing races therein, said thrust load bearing means further comprising ball bearings seated within said races.

14. In the load bearing assembly of claim 11 wherein said shaft is a ball screw, and said thrust load is applied through a ball nut on said ball screw.

15. In the load bearing assembly of claim 11 wherein one of said clutch members is secured to said shaft for rotation therewith.

16. In the load bearing assembly of claim 11 wherein said clutch members have outer annular surfaces, and said spring clutch means is a torsion spring surrounding said surfaces, whereby a load tending to rotate one of the clutch members relative to the other in said one directin tends to wind and tighten the spring against said surfaces, and a load rotating one of the clutch members relative to the other in said opposite direction tends to unwind and loosen the spring.

17. In the load bearing assembly of claim 16 wherein said clutch members have facing surfaces each with bearing races therein, said thrust load bearing means further comprising ball bearings seated within said races.

18. In the load bearing assembly of claim 11 wherein one clutch member has a hub with a transverse slot therein, and further comprising a locking pin extending through said slot and shaft to secure said shaft in rotational engagement with said one clutch member.

19. In the load bearing assembly of claim 18 wherein the other clutch member has a recess receiving said hub, said clutch members being of molded powdered metal construction.

20. In the load bearing assembly of claim 11 further comprising means resisting rotation of at least one of said clutch members relative to said housing.

21. In the load bearing assembly of claim 20 wherein said means resisting rotation further comprises a friction plate between said clutch assembly and housing.

22. In the load bearing assembly of claim 21 wherein the friction of said friction plate between said clutch assembly and housing is proportional to said thrust load.

23. In the load bearing assembly of claim 21 further including further drive means for driving said shaft in said opposite direction, and wherein both clutch members rotate relative said housing where said further drive means overcomes said friction.

* * * * *